US007653938B1

(12) United States Patent
Touitou et al.

(10) Patent No.: US 7,653,938 B1
(45) Date of Patent: *Jan. 26, 2010

(54) EFFICIENT COOKIE GENERATOR

(75) Inventors: Dan Touitou, Ramat Gan (IL); Guy Pazi, Haifu (IL); Yehiel Shtein, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 11/050,904

(22) Filed: Feb. 3, 2005

(51) Int. Cl.
*H04L 29/06* (2006.01)
(52) U.S. Cl. .......................... 726/14; 713/161
(58) Field of Classification Search ............. 726/13–15, 726/22; 713/161
See application file for complete search history.

(56) References Cited

U.S. PATENT DOCUMENTS

| 6,816,910 | B1 * | 11/2004 | Ricciulli ...................... 709/237 |
| 2003/0014525 | A1 * | 1/2003 | DeLima et al. .............. 709/227 |
| 2003/0110274 | A1 | 6/2003 | Pazi et al. |
| 2003/0135625 | A1 * | 7/2003 | Fontes et al. ................. 709/228 |
| 2003/0172289 | A1 * | 9/2003 | Soppera ....................... 713/200 |
| 2004/0032829 | A1 * | 2/2004 | Bonn .......................... 370/230 |
| 2004/0162992 | A1 * | 8/2004 | Sami et al. ................... 713/200 |
| 2006/0146816 | A1 * | 7/2006 | Jain ............................ 370/389 |
| 2007/0169179 | A1 * | 7/2007 | Narad ........................... 726/4 |

OTHER PUBLICATIONS

Rosenberg, et al., "SIP: Session Initiation Protocol", published as RFC 3261, Jun. 2002.
Schulzrinne, et al., "RTP: A Transport Protocol for Real-Time Applications", published as IETF RFC 1889, Jan. 1996.
Rosenberg, et al., "Reliability of Provisional Responses in the Session Initiation Protocol", published as IETF RFC 3262, Jun. 2002.
Roach, "Session Initiation Protocol (SIP)—Specific Event Notification", published as IETF RFC 3265, Jun. 2002.
Handley and Jacobson, "SDP: Session Description Protocol", published as IETF RFC 2327, Apr. 1998.

* cited by examiner

*Primary Examiner*—Eleni A Shiferaw
(74) *Attorney, Agent, or Firm*—Abelman, Frayne & Schwab

(57) ABSTRACT

A method for processing communication traffic includes receiving a data packet sent over a network from a source address and reading a value of an attribute from the data packet. The value is hashed to determine a key, which is used as an index in extracting a tag from a table of random values. A decision is made using the tag regarding forwarding of the communication traffic from the source address.

24 Claims, 7 Drawing Sheets

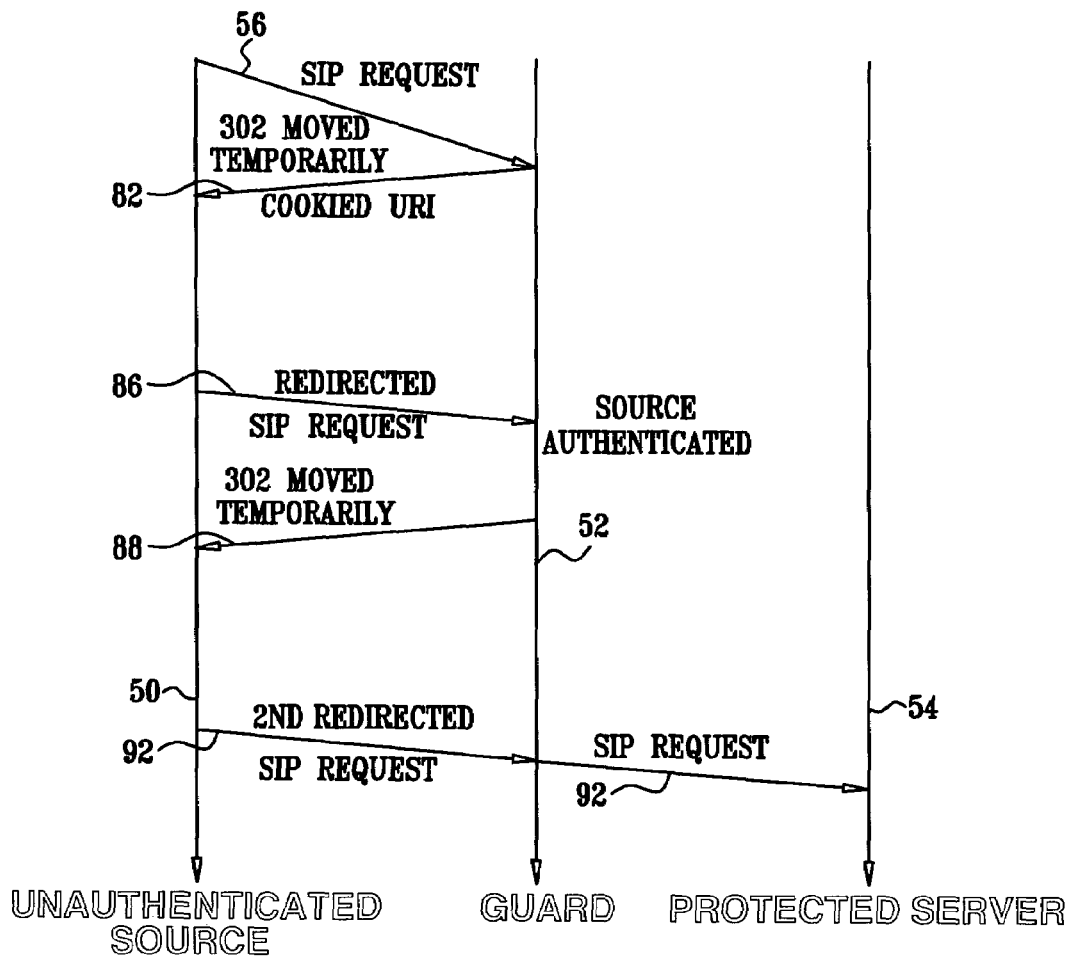
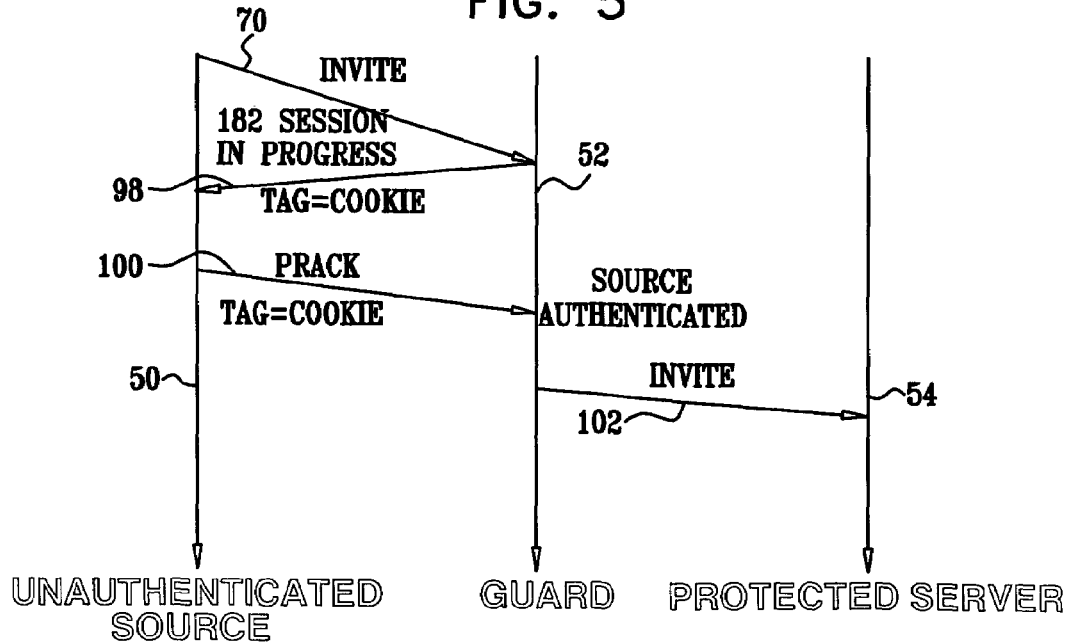

EFFICIENT COOKIE GENERATOR

CROSS-REFERENCE TO RELATED APPLICATIONS

This application is related to another U.S. patent application, filed on even date, entitled, "Authentication of SIP and RTP Traffic." The disclosure of this related application is incorporated herein by reference.

FIELD OF THE INVENTION

The present invention relates generally to computer networks, and specifically to methods and systems for protecting against denial of service attacks in computer networks.

BACKGROUND OF THE INVENTION

In a Denial-of-Service (DoS) attack, an attacker bombards a victim network or server with a large volume of message traffic. Handling this traffic consumes the victim's available bandwidth, CPU capacity, or other critical system resources, and eventually brings the victim to a situation in which it is unable to serve its legitimate clients. Distributed DoS (DDoS) attacks can be even more damaging, as they involve creating artificial network traffic from multiple sources simultaneously. In a "conventional" massive-bandwidth attack, the source of the attack may be traced with the help of statistical analysis of the source Internet Protocol (IP) addresses of incoming packets. The victim can subsequently filter out any traffic originating from the suspect IP addresses, and can use the evidence to take legal action against the attacker. Many attacks, however, now use "spoofed" IP packets—packets containing a bogus IP source address—making it more difficult for the victim network to defend itself against attack.

Voice over IP (VoIP) technologies are gaining popularity as a medium for voice telephony over the Internet. VoIP is a term used in IP telephony for a set of facilities for managing the delivery of voice information using the Internet Protocol (IP). In VoIP, voice information is transmitted in digital form in discrete packets, rather than using the traditional protocols of the public switched telephone network (PSTN). In addition to IP, most VoIP applications use two upper-level protocols: The Session Initiation Protocol (SIP) is used for signaling, and the real time protocol (RTP) is used for media transfer.

SIP is a protocol for initiating an interactive user session that involves multimedia elements such as video, voice, chat, gaming, and virtual reality. SIP is described in detail by Rosenberg et al. in "SIP: Session Initiation Protocol," published as Request for Comments (RFC) 3261 (June 2002) of the Internet Engineering Task Force (IETF) Network Working Group, which is incorporated herein by reference. This RFC, as well as other IETF documents referenced hereinbelow, is available at www.ietf.org/rfc.html. SIP contains primitives that are used for call setup, call progress monitoring and termination. SIP is based on a request/response transaction model, wherein each transaction comprises a SIP request that invokes a particular method, or function, on the server and at least one SIP response. SIP is an application layer protocol that can use either the Transmission Control Protocol (TCP) or User Datagram Protocol (UDP) as a transport protocol.

RTP is an Internet protocol standard that specifies a method for managing the real-time transmission of multimedia data over either unicast or multicast network services. RTP is described in detail by Schulzrinne et al in "RTP: A Transport Protocol for Real-Time Applications," published as IETF RFC 1889 (January 1996), which is incorporated herein by reference. RTP is an application layer protocol and uses UDP as its transport protocol.

The present invention will be more fully understood from the following detailed description of the embodiments thereof, taken together with the drawings in which:

BRIEF DESCRIPTION OF THE DRAWINGS

FIGS. 2-7 are diagrams that schematically illustrate methods for authentication, in accordance with embodiments of the present invention;

DETAILED DESCRIPTION OF EMBODIMENTS

System Description

The growing popularity of Voice over IP makes VoIP servers likely targets for malicious attacks, particularly DDoS attacks. Embodiments of the present invention provide methods and systems for authenticating traffic addressed to a VoIP server in a protected computer network. Authenticating the traffic, in the context of these embodiments, means verifying that the traffic messages are not spoofed, i.e., the messages originate from legitimate hosts and not from bogus, artificial source IP addresses.

Typically, in these embodiments, methods for authenticating a source address involve handshaking between a guard system and an unauthenticated source, wherein the guard system intercepts a packet from the unauthenticated source, sends a packet to the source and awaits response. If the guard system is able to solicit the unauthenticated source to respond to such packet, and if it can ascertain that the same host generated both the response and the original intercepted packet, then it has sufficient grounds for authenticating this source address and allowing further traffic from the source address to reach its destination. (An underlying assumption is that an IP packet, sent to a specific IP address, will reach only the legitimate host who owns this address. This packet will not reach an attacker who may have used this address as a spoofed source IP address.)

A DDoS attack against a VoIP server may comprise either SIP or RTP packets, or both. Both SIP and RTP commonly use UDP as a transport protocol. Unlike TCP, UDP does not offer any handshaking or acknowledgement features that can be used in the authentication process. To overcome the lack of handshaking, some disclosed embodiments use existing commands and structures of the SIP protocol to artificially create the handshaking process required for authentication.

RTP, unlike SIP, is an open-loop protocol that does not support any acknowledgment features. Authentication of RTP packets may use the fact that some packet attributes, such as the packet arrival rate and packet size, are directly related to the codec ("encoder-decoder") used for encoding and decoding voice data carried by the RTP packets. The RTP packet header includes a field that indicates the choice of codec. Some embodiments of the present invention provide authentication of RTP packets by intercepting newly-arriving packets and comparing some of their attributes (e.g., rate of arrival, packet size) to the attributes of the codec used (or intended to be used) for the session, as indicated by the header. An unauthenticated source will be allowed to send RTP packets to a protected VoIP server only if the packet size and arrival rate match the codec used.

Figure 1:
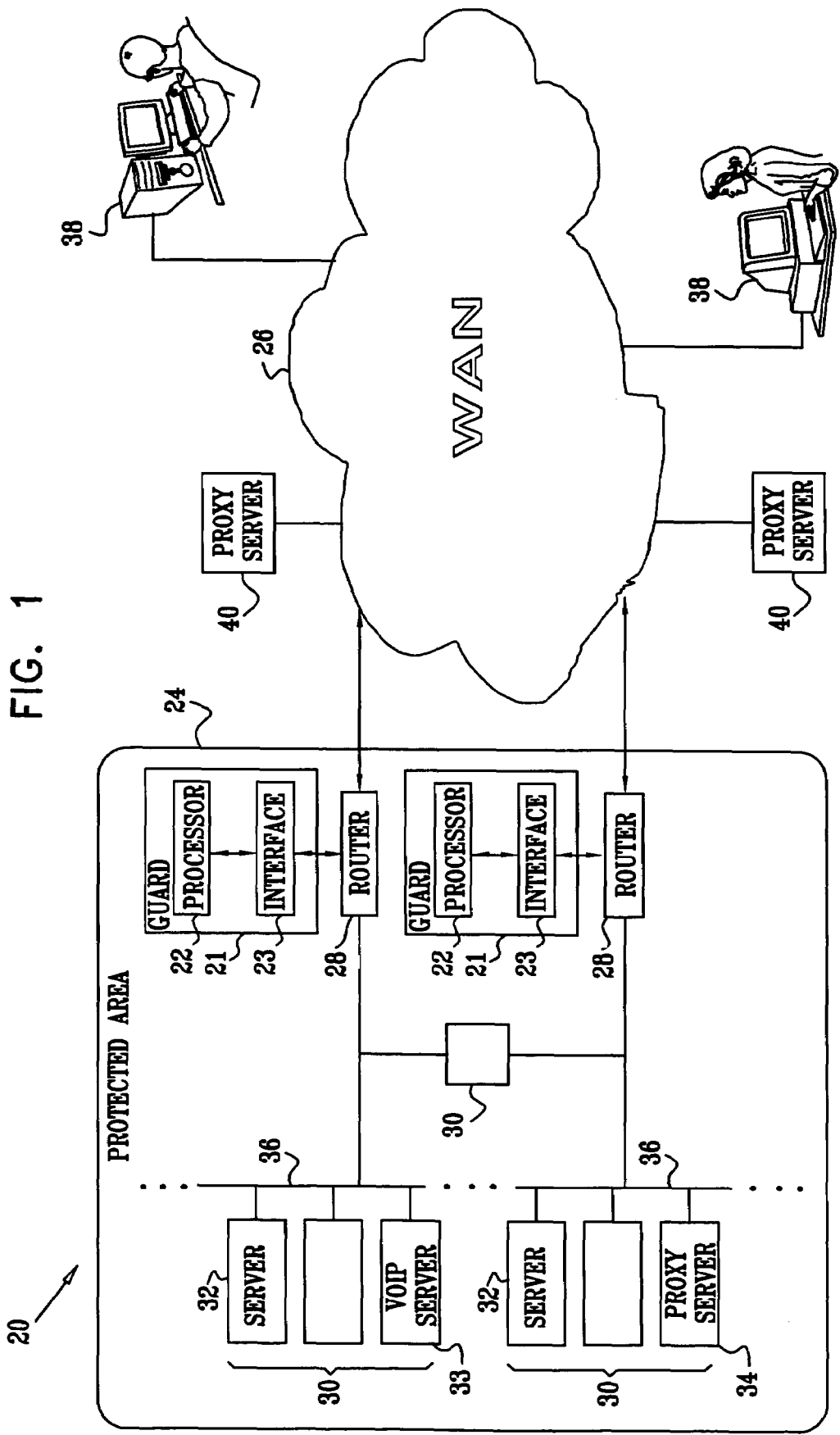
FIG. 1 is a block diagram that schematically illustrates a computer network with a guard device, in accordance with an embodiment of the present invention.

Reference is now made to FIG. 1, which is a block diagram that schematically illustrates a computer network 20 with a guard device 21, in accordance with an embodiment of the present invention. Guard device 21 comprises a guard processor 22 and a network interface 23. A protected area 24 of network 20 communicates with a wide-area network (WAN) 26, typically the Internet, through one or more routers 28. Protected area 24 comprises various network elements 30, such as servers 32, proxy servers 34, clients, switches, internal routers, and bridges, typically connected by one or more local-area networks (LANs) 36. Typically, although not necessarily, protected area 24 comprises a private network, such as an enterprise or campus network. Typically, some of servers 32 may support Voice over IP (VoIP), video and other multimedia services.

Disclosed embodiments typically address servers that support multimedia services, and in particular Voice over IP (VoIP). To prevent a VoIP server 33 from receiving malicious traffic originating from DDoS attacks, guard processor 22 intercepts incoming packets from unauthenticated sources 38, outside protected area 24, that are addressed to the VoIP server 33. Guard processor 22 analyzes these incoming packets in order to detect packets whose source IP addresses are spoofed (i.e., use bogus IP addresses as source IP address). VoIP packets from sources 38 may be addressed directly to VoIP server 33, or they may alternatively be routed through one or more proxy servers 40 on WAN 26 and/or a proxy server 34 in protected area 24. Some of the methods for authentication that are described hereinbelow take these alternative transmission paths into account.

SIP and RTP packets are often processed by proxy servers as they traverse the Internet. Furthermore, the route that an RTP packet traverses is often different from the route a SIP packet has taken, even if they belong to the same VoIP session. In other words, for the same VoIP session, signaling may take one route through the Internet, while voice packets may take a completely different route. When the traffic passes through a proxy server, the SIP and RTP traffic associated with a single VoIP session may -reach the VoIP server from different IP source addresses. Therefore, in some embodiments of the present invention, the guard system authenticates SIP and RTP traffic separately.

Once guard processor 22 has identified a source address as spoofed, it may block further traffic originating from this address from reaching the protected server 33. Alternatively or additionally, guard processor 22 may transfer the spoofed IP address to other security devices employing anomaly detection, signature generation or other techniques for further processing. The description of such devices is outside the scope of this patent application.

Typically, guard device 21 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 21 may be implemented in dedicated hardware logic, or using a combination of hardware and software elements. The guard device may be a standalone unit, or it may alternatively be integrated with other communication or computing equipment, such as router 28, a firewall, or an intrusion detection system (not shown).

Although in FIG. 1 network interface 23 of guard device 21 is shown connected directly to a single adjacent router 28, alternative configurations will be apparent to those skilled in the art. Any other configuration for interconnecting guard device 21 with VoIP server 33 and other elements in network 20 is considered to be within the scope of the present invention.

SIP Authentication Methods

TTL—Time to Live

Before describing the various SIP authentication methods in detail, the concept of TTL should be explained. Time-to-live (TTL) is a value in a header field of each IP packet that tells a network router whether or not the packet has been in the network too long and should be discarded. For a number of reasons, packets may not get delivered to their destinations in a reasonable length of time. For example, a combination of incorrect routing tables could cause a packet to loop endlessly. A solution is to discard the packet after a certain time and send a message to the originator, who can then decide whether to resend the packet. The initial TTL value is set, usually by a system default, in an 8-binary digit field of the packet header. Each router is required to subtract at least one count from the TTL field, and hence the count is typically used to mean the number of router hops the packet is allowed before it must be discarded. Each router that receives a packet subtracts one from the count in the TTL field. When the count reaches zero, the router detecting it discards the packet and sends an Internet Control Message Protocol (ICMP) message back to the originating host.

The TTL mechanism may assist in packet authentication as a means for verifying that different packets were generated by the same host. Since the TTL value is a function of the length of the route a packet has traversed through the Internet, two packets originating from the same host are expected to arrive with a similar TTL value. TTL values from a given host may exhibit small variations, due to load balancing mechanisms, use of network address translator (NAT) machines and other, protocol-dependent route variations. The inventors have found that in practice, more than 90% of all IP addresses generate stable TTL values over a 24 hour period. The remaining addresses exhibit small, continual variations, typically within ±1 to ±2 steps from the average TTL value. Thus, in the context of the present invention, TTL comparison typically involves determining whether the difference between the TTL values of two packets is within a small, predetermined bound. Further aspects of the use of TTL in packet authentication are described in U.S. Patent Application Publication US 2003/0110274 A1, whose disclosure is incorporated herein by reference.

The OPTIONS Method

Figure 2:
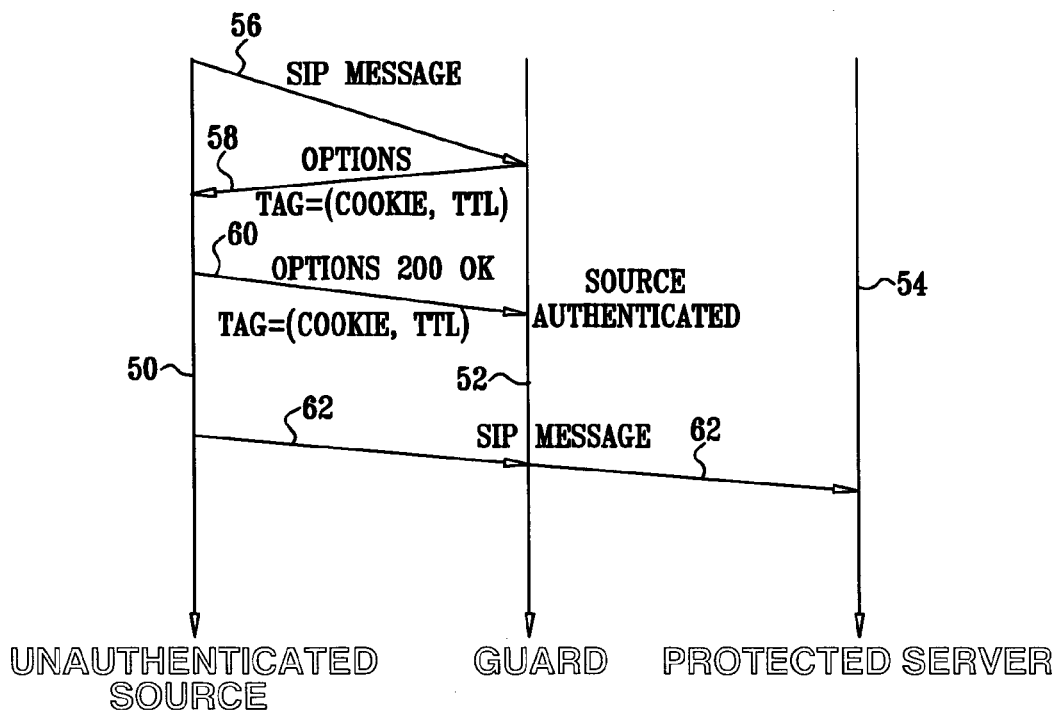

FIG. 2 is a diagram that schematically illustrates a method for authentication of SIP traffic using the SIP OPTIONS message, according to an embodiment of the present invention. The OPTIONS message allows a SIP user agent (UA) to query another UA or a proxy server as to its capabilities. This sort of query allows a client to discover information about the supported methods, content types, extensions, codecs, etc., without "ringing" the other party. A detailed description of this mechanism can be found in IETF RFC 3261 (section 11, pages 66-68), cited above.

FIG. 2 shows three time axes 50, 52 and 54, relating to messages that are transmitted and received by unauthenticated source 38, guard processor 22 and protected VoIP server 33, respectively. Messages are drawn as arrows between the axes. Identical notation is used hereinbelow in FIGS. 3-7.

The method begins when guard device 21 receives, on behalf of the protected VoIP server 33, a first SIP packet 56 arriving from an IP address belonging to unauthenticated source 38. Guard processor 22 receives this message and decodes the TTL value it contains. The guard processor issues, on behalf of protected server 33, an OPTIONS request 58 to unauthenticated source 38. As in any other SIP request, the OPTIONS command contains a tag number. The guard processor encodes the TTL value it received in initial message 56 and uses the encoded value as the tag number in OPTIONS request 58. The encoded tag number is hereafter referred to as a "cookie." Methods of cookie generation that may be used in this context and in the context of other embodiments of the present invention are described hereinbelow with reference to FIGS. 8 and 9.

If unauthenticated source 38 does not respond to OPTIONS request 58, the source IP address remains unauthenticated. The assumption in this case is that there is a likelihood that the source IP address of initial message 56 was spoofed. There are circumstances in which the unauthenticated source may not respond to the OPTIONS request, even though it is a legitimate, non-spoofed, source. For example, the source may have discarded the OPTIONS request because it could not associate it with any valid SIP session. Another reason for a lack of response can be that unauthenticated source 38, although innocent, does not support the OPTIONS functionality. In these cases the guard processor may revert to alternative authentication methods, such as one of the methods disclosed hereinbelow.

If the unauthenticated source responds to OPTIONS request 58, typically with an OPTIONS OK response 60, this response should contain the cookie encoded in OPTIONS request 58 (which in turn contains the encoded TTL value of initial packet 56). The guard processor decodes the TTL value of response 60 and compares it with the TTL value of initial packet 56, which it obtains by decoding the cookie carried by the response. The assumption is that over short periods of time, different packets received from a certain host travel over similar or identical routes and therefore contain identical, or nearly identical, TTL values. The fact that unauthorized source 38 responded to OPTIONS request 58 with a correct tag number proves that source 38 is indeed the owner of the source IP address of initial packet 56. The fact that both initial packet 56 and response 60 to the OPTIONS request contain identical (or nearly identical) TTL values proves that this host was indeed the source of initial packet 56. These two proofs are sufficient for authenticating the source and allowing further SIP messages 62 to reach protected VoIP server 33. If the TTL value of response 60 differs from the TTL value decoded from the cookie in response 60, then initial packet 56 is suspected of being malicious and is dropped.

In another embodiment, unauthenticated source 38 may respond to OPTIONS request 58 with an error message (e.g., a 4xx "command not supported" message, as defined in section 8.1.3.5, page 44 of IETF RFC 3261, cited above). Even such an error message is sufficient for authenticating the source since the error message contains the original tag number and a TTL value of its own.

In yet another embodiment, instead of OPTIONS request 58, guard processor 22 responds with a malformed request, i.e., a request that deliberately contains a syntax error, to packet 56 from unauthenticated source 38. The purpose of this request is to solicit source 38 to respond with an error message. This error message will contain a TTL value which is identical to the TTL value in the first SIP packet, provided the source address is indeed innocent and not spoofed.

In another disclosed embodiment, the guard processor does not encode the TTL value received in initial packet 56. Instead, the guard processor stores this TTL value until response 60 is received. The guard processor compares the stored TTL value of initial packet 56 to the TTL value of response 60 to determine whether messages 56 and 60 originated from the same computer.

TTL comparison is desirable in these methods in order to prove that the originator of acknowledgment message 60 is the same computer that originated initial SIP message 56. Ordinarily, any host challenged with an OPTIONS request may respond (with a SIP 200 OK message, for example), even if that host was not the originator of initial message 56. Therefore, if guard processor 22 were to rely on the OPTIONS mechanism alone, it might then authenticate the IP address of this host and thus permit a spoofer using the IP address to send further SIP packets to server 33. Use of the TTL comparison in addition proves that the same computer was the originator of messages 56 and 60.

One of the benefits of this method is its ability to authenticate any SIP message intercepted by the guard device. This method can thus also be used for authenticating sessions that are already in progress.

The INVITE (or "Redirect Final Answer") Method

Figure 3:
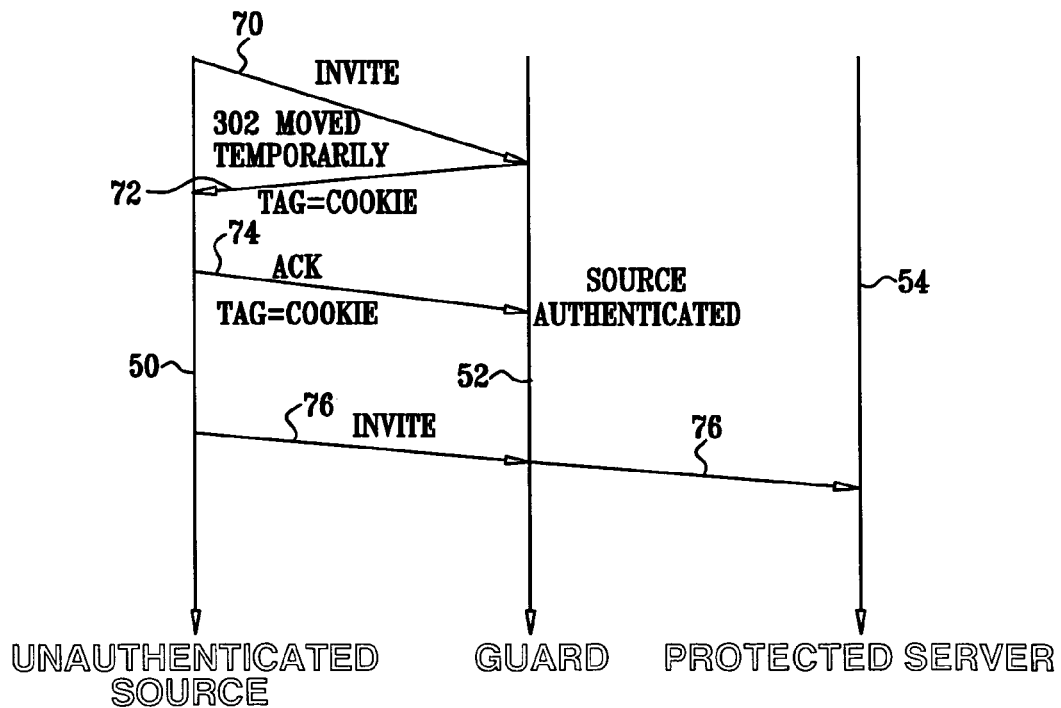

FIG. 3 is a diagram that schematically illustrates a method for authentication using the SIP INVITE message, according to an embodiment of the present invention. In the SIP protocol (section 13, pages 77-85 of IETF RFC 3261, cited above), whenever a user agent client (UAC) desires to initiate a session, it formulates an INVITE request 70. The INVITE request asks a server to establish a session. The invitation may be accepted by sending a 2xx response. If the invitation is not accepted, a 3xx, 4xx, 5xx or 6xx response is sent, depending on the reason for the rejection.

The method initiates when guard device 21 receives, on behalf of protected server 33, INVITE request 70 arriving from an IP address belonging to unauthenticated source 38. Guard processor 22 responds to this request with a redirection response 72, such as the 302 "moved temporarily" command or the 305 "use proxy" command. Redirection response 72 directs the INVITE originator to retry the request at the new address given in the message body. Redirection response 72 sent by the guard processor may be a trivial one, containing the same address as the address of initial INVITE request 70. The guard processor encodes a cookie as the tag number in redirection response 72. (As noted earlier, methods for generating and authenticating encoded cookies are described in detail hereinbelow.)

Unauthenticated source 38 receives redirection response 72 and responds with an ACK 74, containing the encoded cookie. Once guard processor 22 verifies that the cookie contained in ACK message 74 is identical to the cookie it encoded in redirection response 72, it has sufficient proof to authenticate the source address of initial INVITE request 70 as non-spoofed. A subsequent INVITE request 76, arriving from this address, is allowed to reach protected server 33.

There are scenarios in which INVITE request 70 is routed through a proxy server, whereas ACK message 74 is received directly from source 38. In these scenarios, the encoded cookie authenticates both the originator of the INVITE request and the originator of the ACK message simultaneously, namely the both the proxy and the UA.

The Double Redirection Method

FIG. 4 is a diagram that schematically illustrates an alternative method for authentication, using the SIP 302 ("moved temporarily") command, according to an embodiment of the present invention. The method begins when guard device 21 receives, on behalf of protected VoIP server 33, a SIP request 56 arriving from an IP address belonging to unauthenticated source 38. Guard processor 22 responds to this request with a 302 ("moved temporarily") redirection request 82. This redirection request directs source 38 to retry the request at a new address (typically in the form of a uniform resource identifier—URI) given in the message body. The new address given in the redirection request is an artificial, non-existent address used for the sole purpose of challenging unauthenticated requests, and is regarded as a "cookied URI."

If the originator of SIP request 56 is indeed the owner of the IP source address that appeared in the request, the originator will receive redirection message 82, and issue a redirected SIP request 86 to the artificial URI address given in redirection request 82. The guard processor receives redirected SIP request 86. At this stage, the source 38 is already authenticated, since it was able to follow the redirection to the cookied URI address. The guard processor responds with a second redirection request 88. Second redirection request 88 directs the unauthenticated source to retry the SIP request again, this time back to the address of initial SIP request 56. Source 38 then reissues a second redirected SIP request 92 to the original address. The guard processor allows SIP request 92 and subsequent traffic to reach protected server 33.

In this method, authentication is achieved by the fact that source 38 receives and responds to the redirection requests.

The PRACK Method

FIG. 5 is a diagram that schematically illustrates a method for authentication using the SIP provisional acknowledgement ("PRACK") message, according to an embodiment of the present invention. PRACK is an optional mechanism for acknowledging non-final answers (e.g., "session in progress" response to an INVITE). The PRACK mechanism is described in detail by Rosenberg et al. in "Reliability of Provisional Responses in the Session Initiation Protocol (SIP)," published as IETF RFC 3262 (June 2002), which is incorporated herein by reference.

The method begins when guard device 21 receives, on behalf of protected server 33, an INVITE request arriving from an IP address belonging to unauthenticated source 38. Guard processor 22 responds to this request with a "session in progress" message 98. The guard device encodes a cookie as the tag number of message 98. According to the SIP protocol (RFC 3262 cited above), the INVITE originator should respond with a PRACK response 100. If such a response is received, it should contain the cookie encoded by the guard processor into message 98. The guard processor decodes the cookie in response 100 and, if the cookie value is correct, authenticates the INVITE originator. The guard processor then delivers initial INVITE 70 to protected server 33 in the form of a new INVITE message 102 for continuation of the call initiation process with source 38.

The SUBSCRIBE Method

Figure 6:
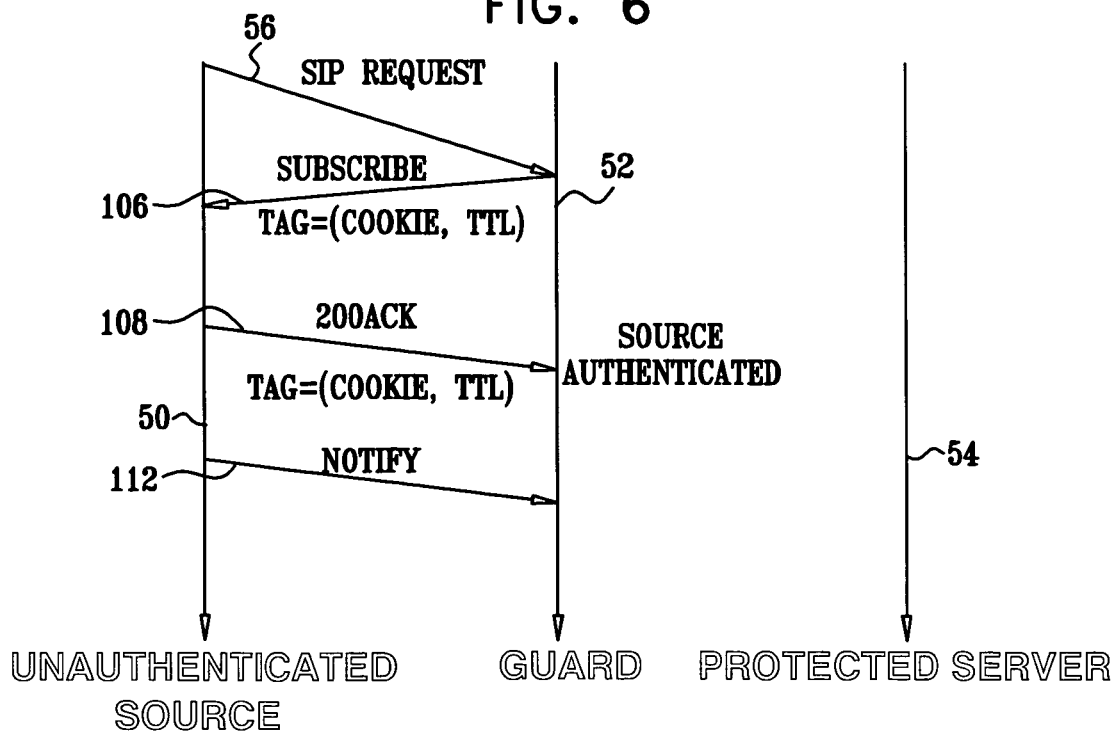

FIG. 6 is a diagram that schematically illustrates a method for authentication using the SIP subscription and notification mechanism ("SUBSCRIBE", "NOTIFY"), according to an embodiment of the present invention. The SIP protocol supports a subscription mechanism, in which entities in the network (servers or clients) can subscribe to receive notification of certain events occurring in other entities. For example, a server agent may subscribe with a user agent to receive notification whenever the user presses a certain button on his or her IP telephone. A detailed description of the SUBSCRIBE/ NOTIFY method is given by Roach in "Session Initiation Protocol (SIP)-Specific Event Notification," published as IETF RFC 3265 (June 2002), which is incorporated herein by reference.

The method begins when guard device 21 receives, on behalf of protected VoIP server 33, SIP request 56 arriving from an IP address belonging to unauthenticated source 38. Guard processor 22 responds to this request with a SUBSCRIBE request 106, pretending to subscribe to an event with the originator of the SIP request. The SIP SUBSCRIBE request may contain an "expiry" attribute, defining the length of time required for the subscription. Since the only purpose of the subscription is to authenticate SIP request 56, the guard processor enters a low "expiry" value, typically on the order of one second. The guard processor encodes the TTL value of initial SIP request 56 as the tag number of SUBSCRIBE request 106. If the originator of the SIP request is innocent, it will respond with an acknowledgement message 108, which contains the encoded TTL cookie as tag number. The guard processor decodes the cookie and compares the TTL values of initial SIP request 56 and of acknowledgement message 108. If the TTL values are identical, or nearly identical, the SIP request originator can be authenticated. If the TTL values differ, the IP address of initial SIP request 56 is suspected of being spoofed.

Acknowledgment message 108 is typically followed by a NOTIFY message 112, informing the subscriber of the current event status. This NOTIFY message is discarded by the guard processor and not forwarded to protected server 33. Because of the low "expiry" value in SUBSCRIBE request 106, notification messages such as NOTIFY message 102 will cease after a short period of time, reducing the burden of unnecessary traffic.

In another embodiment, the unauthenticated source may not support the SUBSCRIBE command, which is an optional feature of SIP. In this case the source will respond with an error message. This error message may also be used for authentication, by decoding the cookie and comparing the TTL value of the error message with the TTL value of the initial packet.

In yet another embodiment, the guard processor does not encode the TTL value received in initial SIP request 56. Instead, the guard processor stores this TTL value until acknowledgement message 108 is received. The guard processor compares the stored TTL value of initial SIP request 56 to the TTL value of acknowledgement message 108 to determine whether messages 56 and 108 originated from the same computer.

TTL comparison is desirable in this method in order to prove that the originator of acknowledgment message 108 is the same computer that originated initial SIP request 56. Any host challenged with a SUBSCRIBE request may respond with a 200 OK message. The TTL comparison proves that the same computer is the originator of messages 56 and 108.

RTP Authentication Methods

Figure 7:
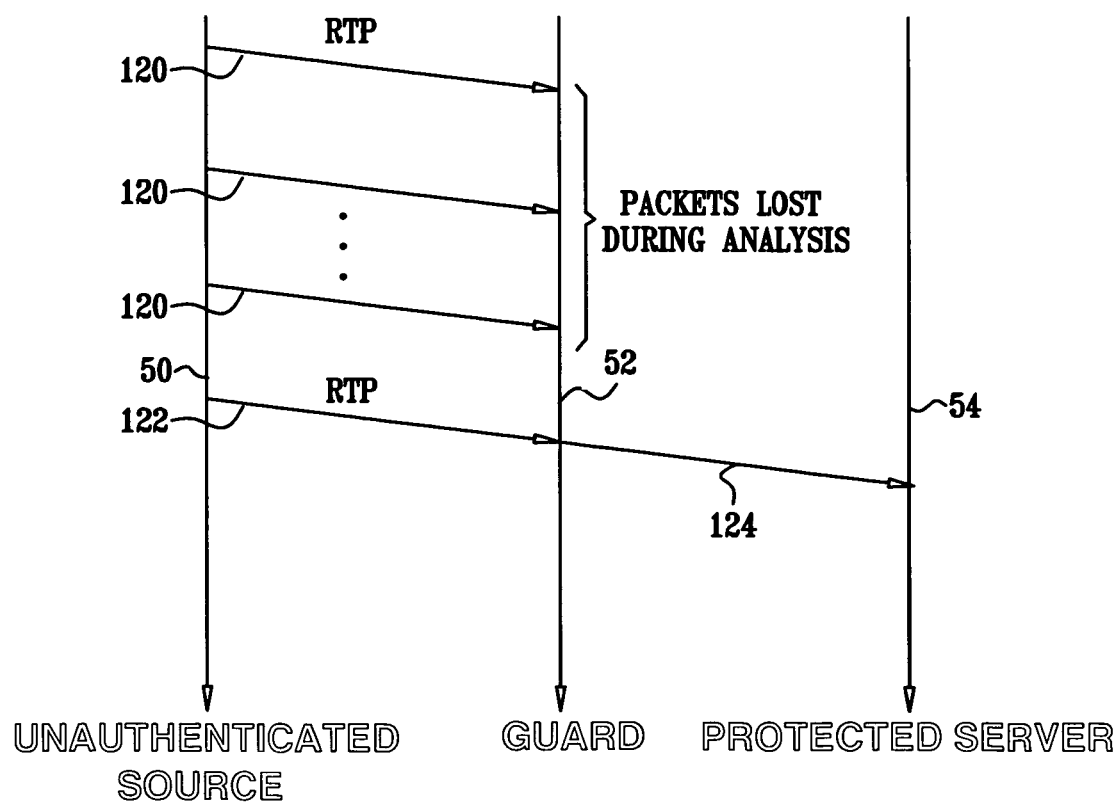

FIG. 7 is a diagram that schematically illustrates a method for authenticating RTP packets, according to an embodiment of the present invention. The RTP protocol does not support acknowledgment or any kind of dialog between the peers. Furthermore, as noted earlier, when SIP communications are carried out through proxy 40 and/or 34, the IP source address authenticated by guard processor 22 will in some cases be that of the proxy. The media communications over RTP may be sent directly from the IP address of source 38 or through another channel, such as a gateway (not shown). Therefore, authentication of RTP packets is based on the examination of attributes of the incoming RTP packets themselves, as described hereinbelow.

The method begins when guard device 21 receives RTP packets 120, originating from unauthenticated source 38, addressed to protected VoIP server 33. Initially, guard processor 22 blocks a number of RTP packets 120 from reaching the protected server, and uses these packets to collect statistical information regarding packet arrival rate and packet size. The guard processor further decodes the type of codec used in the particular RTP session, as indicated by the codec field in the RTP header, and makes sure that the statistical information collected from packets 120 indeed matches the codec attributes. Typically, the guard processor is pre-programmed with the characteristic packet sizes and arrival rates of commonly-used codec types, and compares the statistics of packets 120 to these pre-programmed benchmarks. Typical packet arrival rates for commonly-used codecs are in the range of 34-50 packets per second. Typical packet sizes range from 20-160 bytes. If the packet statistics do not match the benchmarks, it is a sign that packets 120 do not contain legitimate digitized voice media, and therefore are likely to be malicious. In this case, guard processor 22 blocks further RTP traffic from the IP address of source 38.

Alternatively, if the packet statistics match the benchmarks, guard processor 22 may authenticate source 38 and will then permit RTP traffic from the source to pass through to server 33. Alternatively or additionally, subsequent RTP packets 122 may be received and analyzed by the guard processor. Once again, if the attributes of packet 122 (e.g., delay from previous packet, packet size) match the expected codec attributes, packet 122 is delivered to protected server 33 as packet 124.

Alternatively, if the guard processor does not recognize the codec used in the RTP session, it may compare the statistical information collected from packets 120 to a set of general attributes that are not codec-specific.

Further alternatively, the guard processor may allow RTP packets 120 to reach the protected server, in parallel with their analysis. After analyzing packets 120, the guard processor may decide whether to allow subsequent packets 122 reach the protected server or not.

In another embodiment, guard processor 22 authenticates RTP traffic sessions using the Session Description Protocol (SDP). SDP was defined for describing multimedia sessions, for the purposes of session announcement, session invitation, and other forms of multimedia session initiation. User agents (UAs) incorporate SDP messages inside SIP messages, for example in INVITE requests, to provide the VoIP server with the IP address to be used for RTP media traffic, after the call has been set up using SIP.

For example, if the guard processor receives a SIP message containing an SDP message from a UA, potentially going through a proxy server, the guard processor can decode the IP address from the SDP message. If the proxy server was previously authenticated, the guard processor may authenticate subsequent media traffic arriving from this IP address. SDP is described in detail by Handley and Jacobson in "SDP: Session Description Protocol," published as IETF RFC 2327 (April 1998), which is incorporated herein by reference.

Additionally or alternatively, the source addresses of media traffic may be authenticated independently of signaling protocols such as SIP and SDP, as described hereinabove. Furthermore, as demonstrated above, guard processor 22 may independently authenticate the proxy server and the user during a single session.

It should be noted that although some embodiments and examples described hereinabove address VoIP services, the disclosed methods and systems are equally applicable to any application, multimedia or otherwise, that uses the SIP or RTP protocol.

Efficient Cookie Generation

Embodiments of the present invention provide an efficient method for generating encoded cookies and verifying the validity of cookies received during the authentication process. Conventional cookie-based authentication methods suffer from several drawbacks, in terms of the offered level of security, computational complexity and required data structures. The disclosed methods overcome these drawbacks, providing cookie generation that is efficient in terms of computational complexity, while consuming an amount of memory that is proportional only to the rate of legitimate traffic received by guard device 21, rather than to the total volume of traffic, which may be very large during DoS attacks. Although these methods are described here in the specific context of SIP authentication, they are also applicable in authentication of other types of communication traffic, as well as in other applications of encoded tags. Three unique benefits are provided by these embodiments:

- The computational complexity required for the complete authentication process of a given packet is very low, relative to conventional cookie-based authentication methods.
- The data structure required is simple and its size is proportional to the arrival rate of legitimate packets. Many conventional authentication methods require storing the value of each cookie sent until a response is received and the authentication process is completed, i.e., maintaining a data structure on the order of the total packet arrival rate. During a DDoS attack the total arrival rate may be extremely high, dominated by the attack traffic, while only a small minority of the arriving packets is legitimate. The data structure size required by such methods during a DDoS attack may be prohibitive.
- In a conventional cookie-based authentication method, an attacker may intercept and re-use a legitimate cookie, and in this way manage to open multiple spoofed TCP connections. Embodiments of the present invention reduce the probability of an attacker re-using a cookie by replacing each cookie after it has been used for authentication.

Figure 8:
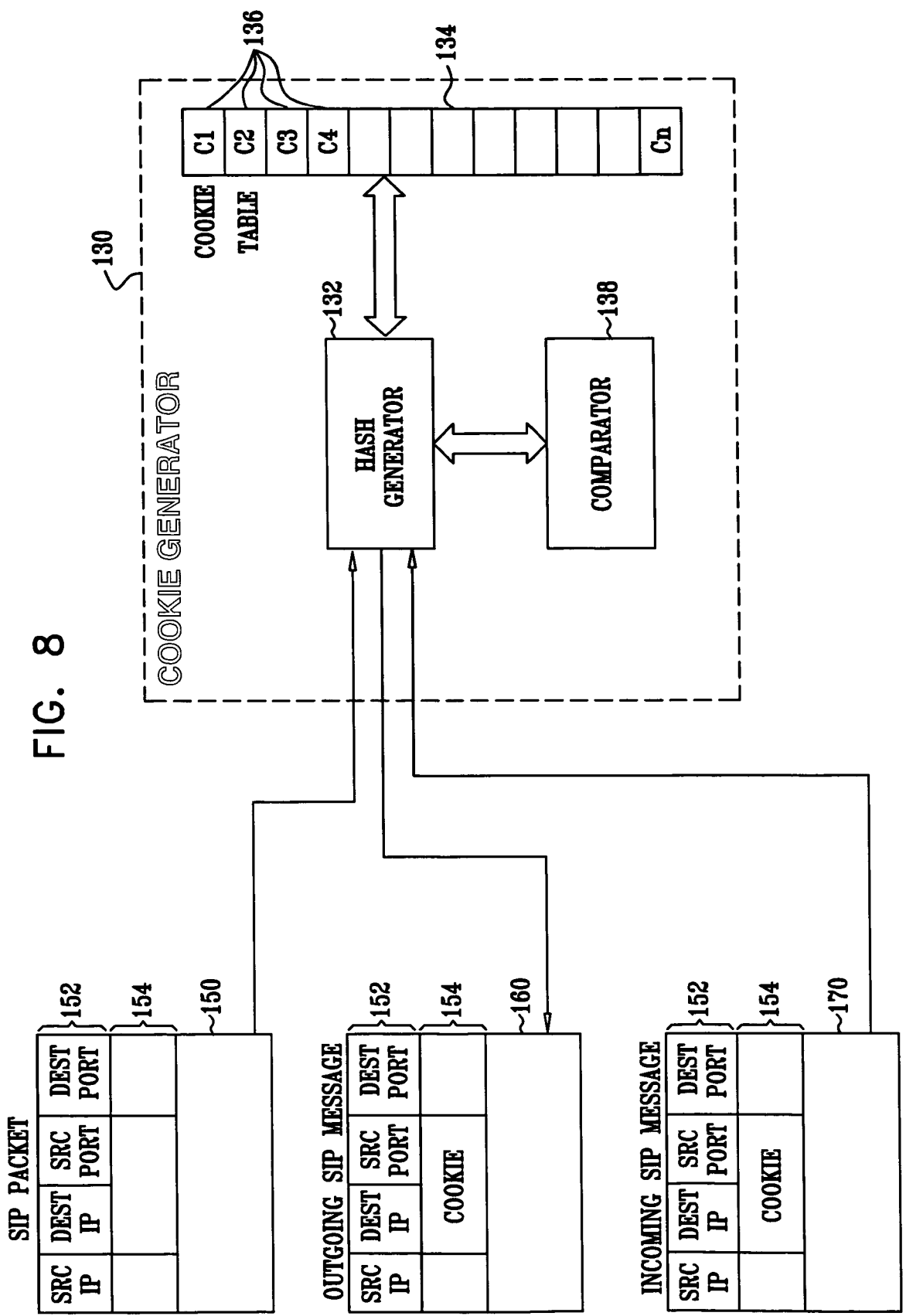
FIG. 8 is a block diagram that schematically illustrates a cookie generator, in accordance with an embodiment of the present invention.

FIG. 8 is a block diagram that schematically illustrates a cookie generator 130, in accordance with an embodiment of the present invention. Cookie generator 130 is typically implemented as part of guard processor 22, although cookie generators of this sort may also be used in other network elements, as noted above. Cookie generator 130 generates encoded cookies for insertion into outgoing SIP packets and verifies the authenticity of cookies received in response packets, using methods described hereinbelow. The cookie generator comprises a hash generator 132 that implements a hash function for mapping packet attributes to cookies. The hash generator calculates a hash value, which is used as a key for indexing a cookie table 134 comprising a set of random cookies 136. A comparator 138 compares cookies received in response SIP packets to legitimate cookies from the cookie table, so as to determine the validity of received cookies and authenticate their source addresses.

Figure 9:
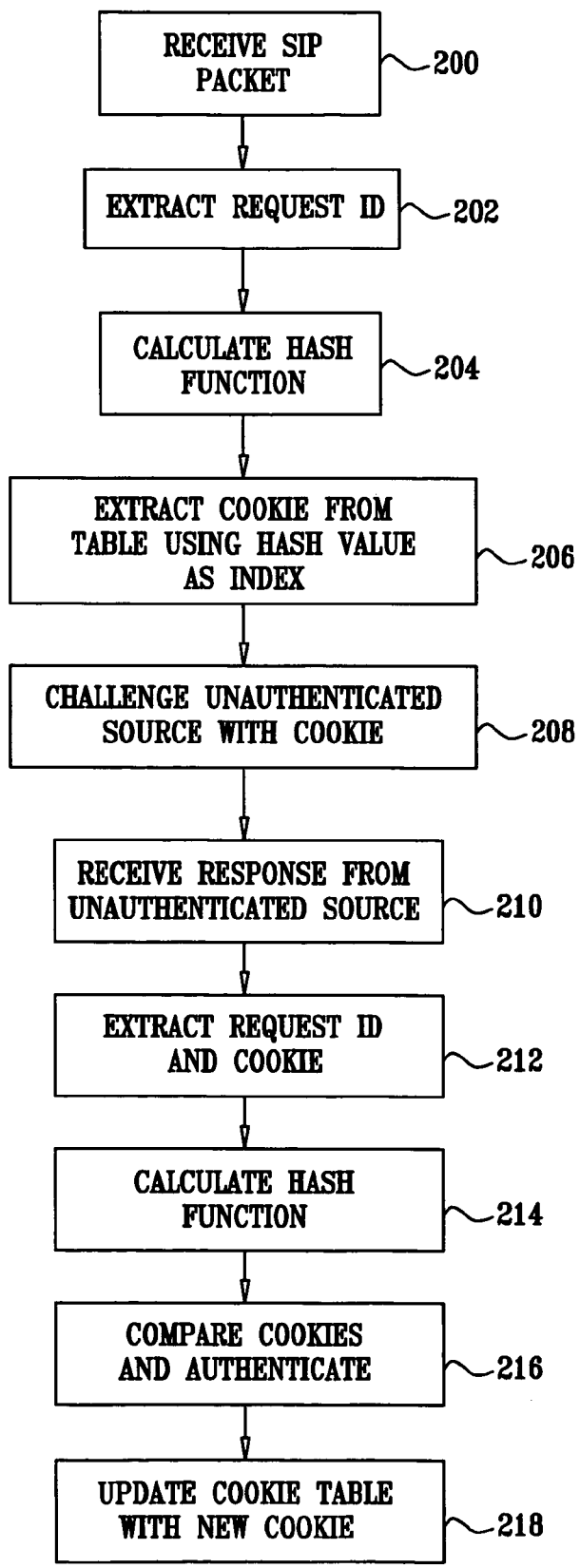
FIG. 9 is a flow chart that schematically illustrates a method for cookie-based authentication, in accordance with an embodiment of the present invention.

FIG. 9 is a flow chart that schematically illustrates a method for authentication using cookie generator 130, in accordance with an embodiment of the present invention. The method begins when guard device 21 receives, on behalf of protected VoIP server 33, a SIP packet 150 arriving from an IP address belonging to unauthenticated source 38, at a packet acceptance step 200. Packet 150 comprises an IP header 152 and a SIP header 154 (as well as a transport-layer header and other header fields that are omitted here for the sake of simplicity). The IP header comprises attributes that identify the source and destination of the packet. This information typically comprises a 5-tuple of [Source IP address, Destination IP address, Source port, Destination port, protocol], or a 4-tuple of [Source IP address, Destination IP address, Source port, Destination port]. The 5-tuple or 4-tuple is also referred to as the "socket number." Hash generator 130 extracts a set of one or more packet attributes, referred to as a request ID (rID), at a rID extraction step 202. The request ID may comprise the socket number or any other combination of one or more attributes of the packet. The hash generator then computes a hash value, based on the rID, at a hash calculation step 204. The hash generator applies a predetermined hash function, which is a function mapping request IDs to hash values. The hash values are used as keys, or indices, to cookie table 134.

Many hash functions are known in the art, and any suitable hash function may be used in implementing hash generator 132. One example is the MD5 (Message Digest algorithm #5), which is a hash function developed by RSA Data Security, Inc. (Bedford, Mass.) and is commonly used for public-key encryption. This function is computation-intensive, however, and it may be preferable to select a hash function of lower computational complexity.

One of the benefits provided by embodiments of the present invention is the ability to use simple hash functions having low computational complexity, typically requiring no more than a few dozen program cycles to execute, without compromising the offered level of security. Since a hash calculation should be performed for every data packet, the low computational complexity of the hash function enables the guard device to keep up with the high rate of traffic during DDoS attacks. The use of such functions is enabled by the fact that the hash function does not generate the cookie directly, as is commonly known in the art, but rather generates a hash value that serves as an index to a table of replaceable random cookies, as will be explained below.

The hash value provided by the hash function is used as an index, or key, for extracting a random cookie from cookie table 134, at an extraction step 206. The cookie extraction is illustrated by the following pseudo-code (wherein Cset denotes the data structure comprising cookie table 134, and hash denotes the hash function):

GenCookie (rID)
return Cset [hash (rID)]

Cookie table 134 comprises a set of random cookies, sometimes also referred to as "random tags." The cookies typically comprise 32-bit pseudorandom numbers. The size of table 134 typically depends on the arrival rate of legitimate packets. The table size should be as large as feasible to reduce the likelihood of collision between the hash values of two legitimate requests.

The cookie extracted from the cookie table is provided by cookie generator 130 to guard processor 22 and inserted into SIP header 154 of an outgoing SIP message 160. The outgoing SIP message is used by guard device 21 for challenging the unauthenticated source, at a challenging step 208. Challenging may follow any of the cookie-based authentication methods described hereinabove, or other suitable cookie-based authentication methods.

The method continues when guard device 21 receives an incoming SIP message 170 from the unauthenticated source, in response to outgoing SIP message 160, at a response reception step 210. SIP header 154 of message 170 comprises a returned cookie. The hash generator extracts the request ID from message 170. Both the request ID and the returned cookie from message 170 are extracted at an incoming message extraction step 212. If the unauthenticated source is indeed the originator of both packet 150 and message 170, this source will be considered "non-spoofed." In this case the request ID of message 170 will map, using the hash function, to a cookie in table 134 that is identical to the returned cookie included in header 154 of message 170.

Hash generator 132 calculates a hash value corresponding to the request ID extracted from message 170. The hash generator uses this value as the key to access cookie table 134 and obtain a cookie (referred to as a "second cookie") at a second cookie calculation step 214. Comparator 138 compares the second cookie to the returned cookie in SIP header 154 of message 170, at an authentication step 216. If the two cookies match, the comparator declares a successful authentication, and guard device 21 accordingly authenticates source 38. Otherwise, source 38 is considered spoofed.

Finally, having completed a successful authentication, cookie generator 130 replaces the corresponding entry in cookie table 134 with a new random cookie at a table updating step 218. Note that step 218 is not performed if the authentication is not successful. The replacement is performed so that each cookie is used only once, to prevent an attacker who succeeds in discovering a legitimate cookie value in table 134 from re-using the cookie in a spoofed response packet.

Assuming table 134 has size n, and assuming that cookies are not replaced, an attacker has a probability of 1/n of penetrating the hash function with a spoofed response packet containing a previously-used cookie, assuming the attacker has no knowledge of the hash function. If the attacker does have some knowledge of the hash function, the probability may be higher. In any case, this probability is not negligible. The authentication method with cookie replacement is illustrated by the following pseudo-code:

Authenticate(cookie, rID)
i=hash(rID)
if cookie==Cset[i] then
   Cset[i]=newcookie( )
   return true
else
   return false One drawback of replacing cookies is the following:

Assume a scenario in which guard device 21 is in the process of authenticating several legitimate sources within a small time interval, on the order of the round-trip delay between the guard device and the unauthenticated sources. Assume that the sources have request IDs that map to the same entry in cookie table 134 (a feasible scenario, since the size n of table 134 is considerably smaller than the space of all possible request IDs). Therefore, the guard device sends these sources outgoing SIP messages comprising identical cookies. Following authentication of one of the sources, the hash generator replaces the entry with a new cookie. When the incoming SIP message of the next source arrives, the cookie it contains will not match the corresponding table entry, as the table has been updated with the new cookie. This source will not be authenticated successfully, so that legitimate sources may sometimes be unable to access the protected server. The following two disclosed methods reduce the probability of occurrence of this scenario.

Figure 10:
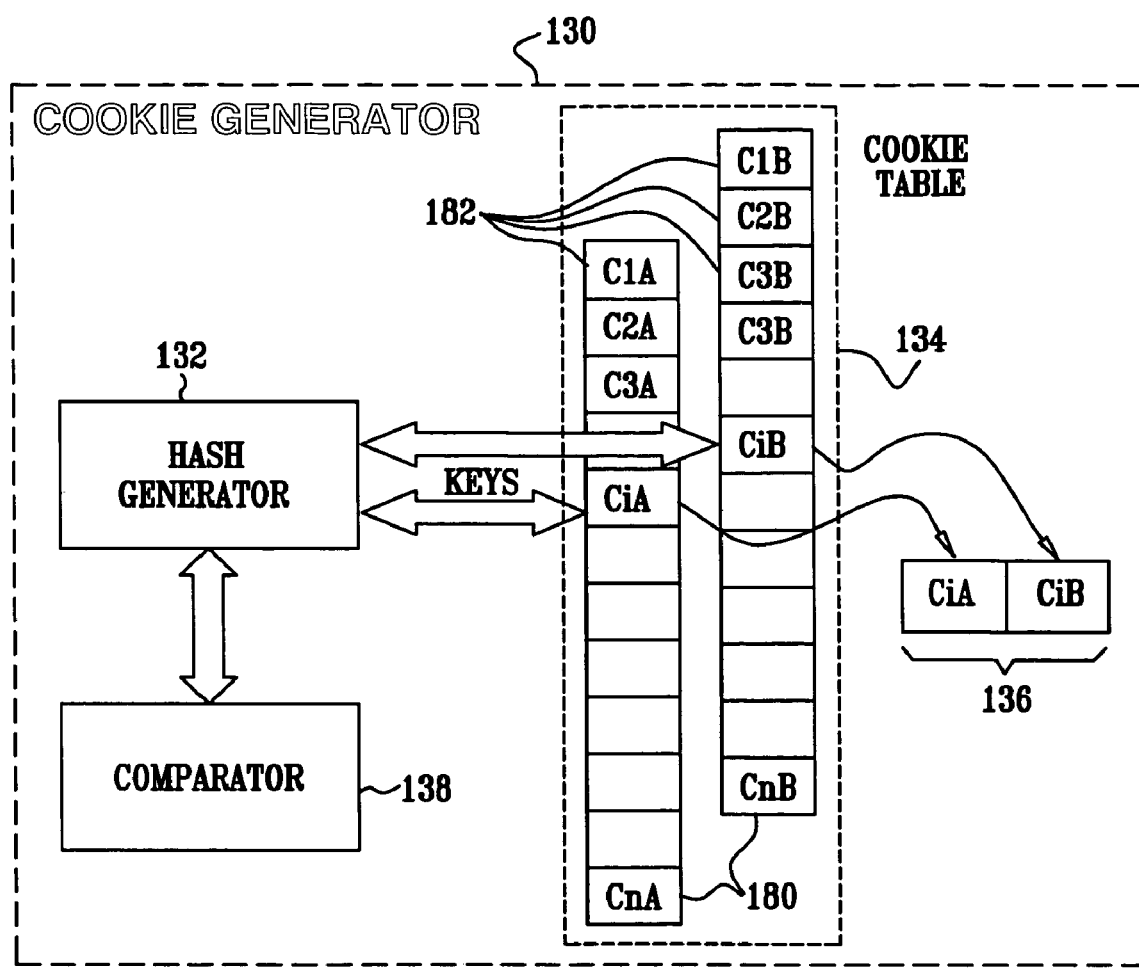
FIG. 10 is a block diagram that schematically illustrates a cookie generator, in accordance with an embodiment of the present invention.

FIG. 10 is a block diagram that schematically illustrates an alternative implementation of cookie generator 130, in accordance with an embodiment of the present invention. In this embodiment, cookie table 134 is divided into several sub-tables 180, typically two sub-tables. Hash generator 132 indexes sub-tables 180 together using a set of different hash values (keys) provided by a set of respective, different hash functions. The cookies are fragmented so that each sub-table comprises a respective fragment 182 of the cookie. A concatenation of the fragments from all sub-tables corresponding to a certain request ID provides the complete cookie 136. A successful authentication is declared by comparator 138 if at least one of the respective fragments of the second cookie and the returned cookie match each other. Following successful authentication, the hash generator replaces only one fragment of the used cookie in table 134 at step 218, leaving the remaining fragments unchanged.

A typical Authenticate method for the embodiment of FIG. 10 is illustrated by the following pseudo-code:
    Authenticate(rID)
    if cookie[i]=Cset-i[hash-i(rID)] for some
    i=1 ... r then
        Cset−i[hash-i(rID)]=newcookie( )
        return true
    else
        return false In this expression, Cset-1, ... , Cset-r denote a set of r sub-tables 180, and hash-1, ... , hash-r denote r hash functions that map the request ID to the r cookie fragments stored in the respective r sub-tables.

For example, FIG. 10 shows two fragments labeled "CiA" and "CiB" that are indexed using two different hash functions operating on the same request ID. The concatenation of the two fragments produces the complete cookie 136. Comparator 138 declares a match between two cookies if at least one of their fragments matches at step 216. This method ensures that all legitimate sources are authenticated, as long as the number of simultaneous authentications corresponding to the same entry in table 134 is not greater than the number of sub-tables.

In alternative embodiments, the hash generator replaces all fragments of the used cookie, or at least all fragments that were found to match. The following pseudo-code illustrates the sub-table method with this sort of cookie fragment replacement:
    GenCookie(rID)
    return Cset-1[hash-1(rID)].Cset-2[hash-2(rID)]
        ... Cset-r[hash-r(rID)]
    Authenticate(rID)
    if cookie[i]=Cset-i[hash-i(rID)] for some
    i=1 ... r then
        for j=1 to r do
            if cookie[j]=Cset-j[hash-j(rID)]
                then Cset-j [hash-j (rID)]=newcookie( )
        return true
    else
        return false In an alternative embodiment having a single cookie table 134, the hash generator holds the used cookie along with the new cookie in table 134 for a predetermined time period (typically on the order of the total time required for a single authentication). Outgoing SIP messages always comprise the new cookie, but incoming SIP messages may still be authenticated using either the used cookie or the new cookie during the predetermined time period. This method requires an additional data structure for temporary storage of the used cookie. The method is illustrated by the pseudo-code given below. (In this code, Csetprev is the set of previously-used cookies. The expression Used-Used[i] is true if successful authentication has occurred using the cookie stored in Cset[i]. TS-TS[i] is the expiration time of the cookie stored in Csetprev[i].)
    Shift(i) if Used[i] and TS[i]>time
        Used[i]=false
        Csetprev[i]=Cset[i]TS[i]=time ( )+
        round trip delay;
        Cset[i]=newcookie( );
    GenerateCookie(rID)
        Shift(hash (rID));
        Return Cset[hash (rID)];
    Authenticate(rID, cookie)
        i=hash (rID)
        Shift(i);
        If cookie==Cset[i]
            Used[i]=true
            return true
        else
        if cookie==Csetprev[i] and TS[i]<
        time( )
            return true;
        else
            return false The cookie generation methods described hereinabove may be used in conjunction with all authentication methods described in this application that require the use of encoded cookies. Alternatively, any other suitable cookie generation method known in the art may be used.

Furthermore, the disclosed methods may be used in other applications of cookie-based authentication. For example, cookies may be generated and validated in this manner in the TCP "three-way-handshake" mechanism. In this implementation, packet 150 comprises a TCP SYN packet, message 160 comprises a SYN-ACK with the cookie used as the ISN (Initial Sequence Number), and message 170 comprises an ACK. The disclosed methods may also be used for authenticating TCP RST packets and DNS (Domain Name System) packets, in conjunction, for example, with authentication methods described in U.S. patent application Ser. Nos. 10/251,912 and 10/792,653. Additionally or alternatively, these methods may be used to identify innocent computers that unknowingly participate in a DDoS attack ("zombies") by sending higher-level protocol requests to a server after being infected with a worm, in conjunction with methods described, for example, in U.S. Provisional Patent Application 60/539,327. These three patent applications are assigned to the assignee of the present patent application, and their disclosures are incorporated herein by reference. Other applications of cookie generator 130 will be apparent to those skilled in the art.

In addition, the disclosed methods of hashing a table of random tag values are not limited to anti-DDoS guard devices. These methods may be used for other data packet forwarding applications that require efficient processing of large volumes of packets, such as methods implemented in routers, firewalls and similar systems.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for monitoring communication traffic, comprising:
  receiving a first data packet sent over a network from a source address;
  reading a first request ID from the first data packet, and hashing, by a hash generator, the first request ID to determine a first key;
  indexing a table of random cookies using the first key, so as to extract a first cookie having a random value from the table;
  sending to the source address an outgoing message comprising the first cookie;
  receiving a second data packet over the network subsequent to the first data packet;
  reading a second request ID from the second data packet, and hashing, by a hash generator, the second request ID to determine a second key;
  indexing the table using the second key, so as to extract a second cookie having a random value from the table;
  reading a cookie value from the second data packet;
  comparing the second cookie to the cookie value, so as to assess an authenticity of at least one of the first and second data packets;
  updating one of the cookies having a random value in the table corresponding to the second key if the second cookie matches the cookie value; and
  wherein the first data packet is a session initiation protocol (SIP), the first request ID is a first source IP address and the second request ID is a second IP address.

2. The method according to claim 1, wherein said updating one of the cookies comprises:
  generating a new cookie having a random value to replace a used cookie having a random value corresponding to the second key;
  maintaining both the new cookie and the used cookie for a predetermined time period; and
  authenticating subsequent packets responsively to both the new cookie and the used cookie during the time period.

3. The method according to claim 1, wherein the first data packet comprises at least one of a TOP SYN packet and a TCP RST packet, and wherein the outgoing message comprises a TCP response.

4. The method according to claim 1, wherein the first data packet is a DNS request packet, and the outgoing message comprises a DNS response.

5. The method according to claim 1, wherein the first data packet comprises a request sent to a server in accordance with a higher-level protocol, and the outgoing message comprises a challenge sent to the source address in accordance with the higher-level protocol.

6. The method according to claim 1, wherein the first request ID comprises a socket number.

7. The method according to claim 1, wherein
  said hashing the first request ID comprises determining two or more keys using respective hash functions,
  said indexing the table comprises indexing two or more sub-tables using the two or more keys, respectively, the two or more sub-tables comprising respective fragments of the random cookies, and
  said comparing the second cookie to the cookie value comprises fragmenting the second cookie and the cookie value, and comparing the fragments of the second cookie to the respective fragments of the cookie value.

8. The method according to claim 7, and also comprising, if one or more of the fragments of the second cookie match one or more of the fragments of the cookie value, updating at least one of the one or more fragments of the cookie value.

9. A method for processing communication traffic, comprising:
  receiving a data packet sent over a network from a source address;
  reading a value of a request ID from the data packet;
  hashing, by a hash generator, the value to determine a key;
  extracting a first cookie having a random value from a table of random cookies using the key as an index to the table;
  sending to the source address an outgoing message comprising the first cookie;
  receiving a response data packet over the network subsequent to the data packet, the response data packet comprising at least a cookie value and response ID;
  hashing, by a hash generator, the response ID to determine other key;
  indexing the table using the other key, so as to extract a second cookie having a random value from the table;
  making a decision by comparing the second cookie to the cookie value, regarding forwarding of the communication traffic from the source address; and
  updating one of the cookies having a random value in the table corresponding to the second key if the second cookie matches the cookie value; and
  wherein the data packet is a session initiation protocol (SIP), the request ID is a first source IP address and the response ID is a second IP address.

10. The method according to claim 9, wherein said making a decision comprises assessing an authenticity of the data packet.

11. The method according to claim 9, wherein the request ID comprises a socket number.

12. Apparatus for monitoring communication traffic, comprising:
  a network interface, which is adapted to communicate with a network; and
  a guard processor, which is coupled to the network interface so as to receive a first data packet sent over the network from a source address, to read a first request ID from the first data packet, to hash the first request ID to determine a first key, to index a table of random cookies using the first key, so as to extract a first cookie having a random value from the table, to send to the source address an outgoing message comprising the first cookie, to receive a second data packet over the network subsequent to the first data packet, to read a second request ID from the second data packet, to hash the second request ID to determine a second key, to index the table using the second key, so as to extract a second cookie having a random value from the table, to read a cookie value from the second data packet, and to compare the second cookie to the cookie value, so as to assess an authenticity of at least one of the first and second data packets, updating one of the cookies having a random value in the table corresponding to the second key if the second cookie matches the cookie value; and
  wherein the first data packet is a session initiation protocol (SIP), the first request ID is a first source IP address and the second request ID is a second IP address.

13. The apparatus according to claim 12, wherein the processor is arranged to generate a new cookie having a random value to replace a used cookie corresponding to the second key, to maintain both the new cookie and the used cookie for a predetermined time period, and to authenticate subsequent packets responsively to both the new cookie and the used cookie during the time period.

14. The apparatus according to claim 12, wherein the first data packet comprises at least one of a TCP SYN packet and a TCP RST packet, and wherein the outgoing message comprises a TCP response.

15. The apparatus according to claim 12, wherein the first data packet is a DNS request packet, and the outgoing message comprises a DNS response.

16. The apparatus according to claim 12, wherein the first data packet comprises a request sent to a server in accordance with a higher-level protocol, and the outgoing message comprises a challenge sent to the source address in accordance with the higher-level protocol.

17. The apparatus according to claim 12, wherein the first request ID comprises a socket number.

18. The apparatus according to claim 12, wherein the processor is arranged to determine two or more keys using respective hash functions, to index respective two or more sub-tables using the two or more keys, the two or more sub-tables comprising respective fragments of the random cookies, to fragment the second cookie and the cookie value, and to compare the fragments of the second cookie to the respective fragments of the cookie value.

19. The apparatus according to claim 18, wherein the processor is arranged so that if one or more fragments of the second cookie match one or more of the fragments of the cookie value, the processor updates at least one of the one or more fragments of the cookie value.

20. Apparatus for processing communication traffic, comprising:
a network interface, which is adapted to communicate with a network; and
a processor, which is coupled to the network interface so as to receive a data packet sent over the network from a source address, to read a value of an attribute from the data packet, to hash the value to determine a key, to extract a first cookie having a random value from a table of random cookies using the key as an index to the table, to send to the source address an outgoing message comprising the first cookie, to receive a response data packet over the network subsequent to the data packet, the response data packet comprising at least a cookie value and response ID, to hash the response ID to determine other key, to index the table using the other key, so as to extract a second cookie having a random value from the table and to make a decision by comparing the second cookie to the cookie value, regarding forwarding of the communication traffic from the source address; and to update one of the cookies having a random value in the table corresponding to the second key if the second cookie matches the cookie value; and wherein the data packet is a session initiation protocol (SIP), the attribute is a first source IP address and the response ID is a second IP address.

21. The apparatus according to claim 20, wherein the processor is arranged to assess an authenticity of the data packet.

22. The apparatus according to claim 20, wherein the attribute comprises a socket number.

23. Apparatus for monitoring communication traffic, comprising:
a network interface, which is adapted to communicate with a network; and
a processor coupled to the network interface, said processor comprising:
means for receiving a first data packet sent over a network from a source address;
means for reading a first request ID from the first data packet, and means for hashing the first request ID to determine a first key; means for indexing a table of random cookies using the first key, so as to extract a first cookie having a random value from the table;
means for sending to the source address an outgoing message comprising the first cookie-tag;
means for receiving a second data packet over the network subsequent to the first data packet;
means for reading a second request ID from the second data packet, and means for hashing the second request ID to determine a second key; means for indexing the table using the second key, so as to extract a second cookie having a random value from the table;
means for reading a cookie value, from the second data packet; and
means for comparing the second cookie to the cookie value, so as to
assess an authenticity of at least one of the first and second data packets; and
means for updating one of the cookies having a random value in the table corresponding to the second key if the second cookie matches the cookie value;
and wherein the first data packet is a session initiation protocol (SIP), the first request ID is a first source IP address and the second request ID is a second IP address.

24. Apparatus for processing communication traffic, comprising:
a network interface, which is adapted to communicate with a network; and
a processor coupled to the network interface, said processor comprising:
means for receiving a data packet sent over a network from a source address;
means for reading a value of an attribute from the data packet;
means for hashing the value to determine a key;
means for extracting a first cookie having a random value from a table of random cookies values using the key as an index to the table;
means for sending to the source address an outgoing message comprising the first cookie;
means for receiving a response data packet over the network subsequent to the data packet, the response data packet comprising at least a cookie value and response ID;
means for hashing the response ID to determine other key;
means for indexing the table using the other key, so as to extract a second cookie having a random value from the table;
means for making a decision, by comparing the second cookie to the cookie value, regarding forwarding of the communication traffic from the source address; and
means for updating one of the cookies having a random value in the table corresponding to the second key if the second cookie matches the cookie value;
and wherein the data packet is a session initiation protocol (SIP), the attribute is a first source IP address and the response ID is a second IP address.

* * * * *